US010811034B1

(12) United States Patent
Wu et al.

(10) Patent No.: US 10,811,034 B1
(45) Date of Patent: Oct. 20, 2020

(54) HEAT SINK STRUCTURE FOR MICROWAVE-ASSISTED MAGNETIC RECORDING (MAMR) HEAD

(71) Applicant: Headway Technologies, Inc., Milpitas, CA (US)

(72) Inventors: Yan Wu, Cupertino, CA (US); Kowang Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/371,507

(22) Filed: Apr. 1, 2019

(51) Int. Cl.
| G11B 5/127 | (2006.01) |
| G11B 5/31 | (2006.01) |
| G11B 5/39 | (2006.01) |
| G11B 5/455 | (2006.01) |
| G11B 5/00 | (2006.01) |

(52) U.S. Cl.
CPC .......... G11B 5/1278 (2013.01); G11B 5/3133 (2013.01); G11B 5/3143 (2013.01); G11B 5/3163 (2013.01); G11B 5/3929 (2013.01); G11B 5/455 (2013.01); G11B 2005/0024 (2013.01)

(58) Field of Classification Search
CPC ........ G11B 5/3133; G11B 5/40; G11B 5/3106
USPC .............................. 360/119.03, 125.3, 125.32
See application file for complete search history.

(56) References Cited

U.S. PATENT DOCUMENTS

| 6,785,092 B2 | 8/2004 | Covington et al. |
| 6,809,899 B1 | 10/2004 | Chen et al. |
| 6,954,340 B2 | 10/2005 | Shukh et al. |
| 7,009,812 B2 | 3/2006 | Hsu et al. |
| 7,589,600 B2 | 9/2009 | Dimitrov et al. |
| 7,724,469 B2 | 5/2010 | Gao et al. |
| 7,835,111 B2 | 11/2010 | Flint et al. |

(Continued)

FOREIGN PATENT DOCUMENTS

| JP | 2002-133610 | 5/2002 |
| JP | 2002-298309 | 10/2002 |

(Continued)

OTHER PUBLICATIONS

PTO Office Action, U.S. Appl. No. 12/964,202, Applicant: Sasaki et al., dated Nov. 28, 2012, 11 pages.

(Continued)

Primary Examiner — Jefferson A Evans
(74) Attorney, Agent, or Firm — Saile Ackerman LLC; Stephen B. Ackerman

(57) ABSTRACT

A microwave-assisted magnetic recording writer is disclosed wherein a heat sink is formed in a write gap (WG) and adjacent to a spin torque oscillator (STO) formed between a main pole (MP) trailing side and a trailing shield (hot seed layer). The WG comprises an electrically insulating layer with thickness of 5-80 Angstroms on the MP trailing side and STO sides. The heat sink layer may be separate coplanar layers on each STO side, or a single layer wrapping around the STO. A Ru or Cu heat sink has sufficient thermal conductivity to reduce STO temperature rise by 11% and 20%, respectively. Accordingly, the STO has longer lifetime at the same bias current density, or higher buffer head voltage is possible while maintaining STO device reliability. Each heat sink has a front side at an air bearing surface, and a stripe height (SH)≥to the STO SH.

20 Claims, 11 Drawing Sheets

(56) References Cited

U.S. PATENT DOCUMENTS

| | | | |
|---|---|---|---|
| 7,957,098 B2 | 6/2011 | Yamada et al. | |
| 7,963,024 B2 | 6/2011 | Neuhaus | |
| 7,978,442 B2 | 7/2011 | Zhang et al. | |
| 7,982,996 B2 | 7/2011 | Smith et al. | |
| 8,027,110 B1 | 9/2011 | Yamanaka et al. | |
| 8,064,244 B2 | 11/2011 | Zhang et al. | |
| 8,068,312 B2 | 11/2011 | Jiang et al. | |
| 8,154,825 B2 | 4/2012 | Takashita et al. | |
| 8,203,389 B1 | 6/2012 | Zhou et al. | |
| 8,203,804 B2 | 6/2012 | Taguchi et al. | |
| 8,264,792 B2 | 9/2012 | Bai et al. | |
| 8,270,112 B2 | 9/2012 | Funayama et al. | |
| 8,295,008 B1 | 10/2012 | Sasaki et al. | |
| 8,310,787 B1 | 11/2012 | Sasaki et al. | |
| 8,320,079 B2 | 11/2012 | Iwasaki et al. | |
| 8,427,781 B1 | 4/2013 | Sasaki et al. | |
| 8,446,690 B2 | 5/2013 | Alex et al. | |
| 8,462,461 B2 | 6/2013 | Braganca et al. | |
| 8,477,452 B2 | 7/2013 | Sasaki et al. | |
| 8,493,687 B2 | 7/2013 | Sasaki et al. | |
| 8,582,240 B1 | 11/2013 | Chen et al. | |
| 8,582,241 B1 | 11/2013 | Yu et al. | |
| 8,604,886 B2 | 12/2013 | Nikonov et al. | |
| 8,634,163 B2 | 1/2014 | Tanabe et al. | |
| 8,749,919 B2 | 6/2014 | Sasaki et al. | |
| 8,767,347 B1 | 7/2014 | Sasaki et al. | |
| 8,792,210 B2 | 7/2014 | de la Fuente et al. | |
| 8,995,088 B1* | 3/2015 | Boone | G11B 5/3146 360/125.32 |
| 9,142,228 B2 | 9/2015 | Fujita et al. | |
| 9,224,411 B1 | 12/2015 | Gao et al. | |
| 9,230,571 B1 | 1/2016 | Chen et al. | |
| 9,299,367 B1 | 3/2016 | Tang et al. | |
| 9,355,655 B1* | 5/2016 | Udo | G11B 5/1278 |
| 9,361,912 B1 | 6/2016 | Liu et al. | |
| 9,406,317 B1 | 8/2016 | Tang et al. | |
| 9,466,319 B1 | 10/2016 | Tang et al. | |
| 9,691,416 B1* | 6/2017 | Izawa | G06F 1/20 |
| 9,824,701 B2 | 11/2017 | Tang et al. | |
| 9,934,797 B2 | 4/2018 | Takahashi et al. | |
| 9,966,091 B2 | 5/2018 | Chen et al. | |
| 10,032,469 B2 | 7/2018 | Lim et al. | |
| 10,037,772 B2 | 7/2018 | Okamura et al. | |
| 10,157,632 B1* | 12/2018 | Song | G11B 5/3113 |
| 10,410,658 B1* | 9/2019 | Liu | G11B 5/09 |
| 2002/0034043 A1 | 3/2002 | Okada et al. | |
| 2004/0150910 A1 | 8/2004 | Okada et al. | |
| 2005/0128637 A1 | 6/2005 | Johnston et al. | |
| 2005/0141137 A1 | 6/2005 | Okada | |
| 2006/0044682 A1 | 3/2006 | Le et al. | |
| 2006/0087765 A1 | 4/2006 | Iwakura et al. | |
| 2006/0103978 A1 | 5/2006 | Takano et al. | |
| 2007/0177301 A1 | 8/2007 | Han et al. | |
| 2008/0013209 A1 | 1/2008 | Sasaki et al. | |
| 2008/0088972 A1 | 4/2008 | Sasaki et al. | |
| 2009/0059426 A1 | 3/2009 | Sasaki et al. | |
| 2009/0080106 A1 | 3/2009 | Shimizu et al. | |
| 2009/0128953 A1 | 5/2009 | Jiang et al. | |
| 2009/0296275 A1 | 12/2009 | Sasaki et al. | |
| 2010/0165517 A1 | 7/2010 | Araki et al. | |
| 2011/0211271 A1 | 9/2011 | Ng et al. | |
| 2012/0292723 A1 | 11/2012 | Luo et al. | |
| 2014/0071562 A1 | 3/2014 | Chen et al. | |
| 2014/0177092 A1 | 6/2014 | Katada et al. | |
| 2015/0043106 A1 | 2/2015 | Yamada et al. | |
| 2015/0310881 A1* | 10/2015 | Koui | G11B 5/314 360/235.4 |
| 2016/0180868 A1* | 6/2016 | Gubbins | G11B 5/3116 360/125.12 |
| 2016/0218728 A1 | 7/2016 | Zhu | |
| 2017/0133044 A1 | 5/2017 | Lim et al. | |
| 2018/0075868 A1 | 3/2018 | Koui et al. | |
| 2019/0251991 A1* | 8/2019 | Le | G11B 5/40 |
| 2019/0251992 A1* | 8/2019 | Ho | G11B 5/7379 |
| 2019/0259413 A1* | 8/2019 | Le | G11B 5/7368 |
| 2020/0176022 A1* | 6/2020 | Li | G11B 5/11 |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action issued in Japanese Patent Application No. 2011-149243, with English language translation.

Nov. 13, 2012, Office Action issued in Japanese Patent Application No. 2011-149244, with English language translation.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

* cited by examiner

HEAT SINK STRUCTURE FOR MICROWAVE-ASSISTED MAGNETIC RECORDING (MAMR) HEAD

RELATED PATENT APPLICATIONS

This application is related to the following: U.S. Pat. No. 9,230,571; Ser. No. 16/197,586, filed on Nov. 21, 2018, and issued as U.S. Pat. No. 10,424,326; and Ser. No. 16/209,151, filed on Dec. 4, 2018, and issued as U.S. Pat. No. 10,490,216; assigned to a common assignee, and herein incorporated by reference in their entirety.

TECHNICAL FIELD

The present disclosure relates to a design for a MAMR head in which a PMR writer has a spin torque oscillator (STO) formed between a main pole trailing side and a write shield, and a heat sink layer formed adjacent to the STO and in the write gap on each side of a center plane that bisects the MP trailing side thereby enabling heat dissipation through the write shield and side shields, and permitting a higher buffer head voltage (BHV) used on the STO to enhance the microwave-assist recording effect when writing transitions on the magnetic media.

BACKGROUND

As the data areal density in hard disk drive (HDD) writing increases, critical dimensions of write heads and dimensions of media bits are both required to shrink. However, as the write head critical dimension shrinks, its writability degrades rapidly. To improve writability, new technologies are being developed that assists writing transitions on the media. Two main approaches currently being investigated are thermally assisted magnetic recording (TAMR) and microwave assisted magnetic recording (MAMR). The latter is described by J-G. Zhu et al. in "Microwave Assisted Magnetic Recording", IEEE Trans. Magn., vol. 44, pp. 125-131 (2008). MAMR uses a spin torque device to generate a high frequency field that reduces the coercive field of media grains thereby allowing the grains to be switched with a lower main pole field.

Spin torque transfer (STT) devices are based on a spin-torque transfer effect that arises from the spin dependent electron transport properties of ferromagnetic-spacer-ferromagnetic multilayers. When a current passes through a magnetic multilayer in a CPP (current perpendicular to plane) configuration, the first ferromagnetic layer (FM1) will generate spin polarized current as the electron traverses in the material. When the spin polarized current is transmitted through a polarization preservation spacer, the spin angular moment of electrons incident on a second ferromagnetic (FM2) layer interacts with magnetic moments of the FM2 layer near the interface between the FM2 layer and non-magnetic spacer. Through this interaction, the electrons transfer a portion of their angular momentum to the FM2 layer. As a result, spin-polarized current can switch the magnetization direction of the FM2 layer if the current density is sufficiently high.

MAMR typically operates with the application of a bias current from the main pole (MP) across a spin torque oscillator (STO) device to a trailing shield also known as the write shield, or in the opposite direction, in order to generate a high frequency RF field (from an oscillation layer) while a magnetic field is applied from the writer, which typically consists an main pole and write shield structure at an air bearing surface (ABS), to the magnetic medium. In existing designs, spin torque from spin polarized electrons in a magnetic layer is applied to the oscillation layer (OL) in the STO device. In many cases, the spin polarized current is from a spin polarization (SP) layer, and produces a spin torque on the OL that drives OL magnetization into a precessional state, which in turn produces a RF field near the location where an transition is being written in a magnetic medium. The rotating field assists the flipping of the magnetization in the grains being written. To enhance the microwave-assisted recording effect, higher buffer head voltage (BHV) is desirable as the assist field is proportional to the number of total spin polarized electrons being transmitted to the OL, which is in turn proportional to the bias current. On the other hand, usable BHV is limited by potential breakdown of the STO element due to electromigration. As it is well known, element temperature and local current density are the two key factors in order to control electro-migration. Therefore, an improved MAMR design is needed where BHV may be increased above currently acceptable levels to improve performance without comprising device reliability, or where greater cooling is provided when using a BHV typical of current MAMR schemes so that device lifetime is increased.

SUMMARY

One objective of the present disclosure is to provide a MAMR head design with higher BHV allowance compared with current designs to enhance the microwave-assist effect without degrading device reliability, or to provide a temperature reduction at the same BHV level used in current designs to deliver a longer lifetime than present designs A second objective of the present disclosure is to provide a method of fabricating the PMR writer with a MAMR element according to the first objective.

According to one embodiment of the present invention, these objectives are achieved with a PMR writer layout wherein a STO device is formed between a main pole tapered trailing side and a trailing shield, and within a write gap (WG). STO thickness is less than or equal to the WG thickness, and STO width is less than or equal to the physical pole width (PW) of the MP on the tapered trailing side. Leads from the main pole and trailing shield are connected to a direct current (dc) source that provides an applied current ($I_a$) across the STO device during a write process. The STO device is comprised of at least a first non-magnetic and spin polarization preserving spacer (NM1), a spin polarization layer (SP) on a first side of NM1, and an oscillation layer (OL) on a second side of NM1 that is opposite to the first side. There is a second non-magnetic spacer (NM2), which does not preserve the spin polarization when polarized electrons traverse through it, to give a MP/NM2/OL/NM1/SP/TS configuration where $I_a$ is applied from the TS to MP, or a MP/SP/NM1/OL/NM2/TS configuration where $I_a$ is applied from the MP to TS. In an alternative embodiment, a second SP layer (SP2) that is antiferromagnetically (AF) coupled to a SP1 layer through an AF coupling (AFC) layer may be added to give a MP/SP1/AFC/SP2/NM2/OL/NM1/SP/TS configuration or a MP/SP/NM1/OL/NM2/SP2/AFC/SP1/TS configuration. The second SP layer provides additional spin torque to the OL thereby enhancing the MAMR effect.

Thus, the aforementioned embodiments have a common STO feature where at least one SP layer transmits spin torque onto an OL so that the OL is driven into a precessional state to generate a RF field, which can be used for assisted transition writing on the media.

According to other embodiments, the SP layer may be merged into either the MP or TS depending on the direction of the applied current so that a portion of the MP near the STO bottom surface, or a portion of the TS proximate to the STO top surface applies spin torque to the OL to drive the OL into a precessional state.

A key feature in all embodiments of the present disclosure is a heat sink layer hereinafter referred to as the "heat sink" is formed adjacent to each side of a STO device at the ABS and separated from the STO sides by an insulator layer such as alumina. The heat sink is preferably made of a material with a thermal conductivity>100 Watts per meter-Kelvin (W/m–k) such as Ru, Cu, Au, W, Pt, Pd, diamond-like carbon, or diamond, and enables efficient heat dissipation away from the STO element because of the improved thermal conductivity when compared to prior art where a single layer of insulator is normally used. The heat sink bottom surface is formed on top of the side shields and main pole area beyond the STO element, and has a thickness less than that of the STO and intended write gap (WG). The heat sink top surface contacts a hot seed layer in the trailing shield structure to allow heat dissipation.

In one embodiment, the heat sink has a stripe height substantially equal to that of the STO. An insulator layer adjoins the STO backside in order to ensure current flow through the STO. According to an alternative embodiment, the heat sink may wrap around the insulator layer surrounding the STO to provide a continuous layer from the ABS on one side of the STO to the ABS on the other STO side.

The present disclosure also encompasses a process flow for forming a heat sink at an ABS and adjacent to each side of a STO device according to an embodiment described herein.

DETAILED DESCRIPTION

Figure 1:
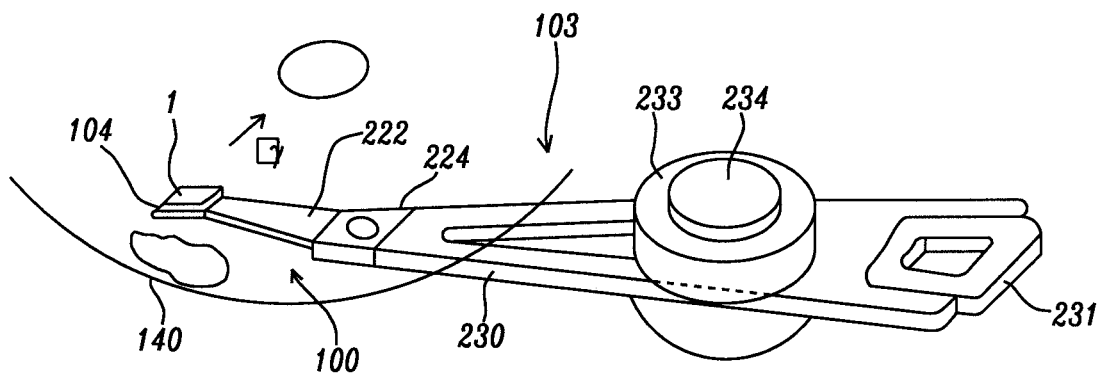
FIG. 1 is a perspective view of a head arm assembly of the present disclosure.

The present disclosure is a MAMR writer structure wherein a heat sink is formed within a write gap and adjacent to each side of a STO device that is formed between a main pole and a trailing shield structure, and a process for making the same. Various configurations are provided for the STO device. However, the benefits of the head sink are not limited to a specific STO configuration. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance from the ABS in the x-axis direction. A magnetic bit comprises a plurality of grains and is considerably enlarged in the drawings over an actual size in order to more easily depict a magnetization therein. The terms "MP field" and "write field" may be used interchangeably.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
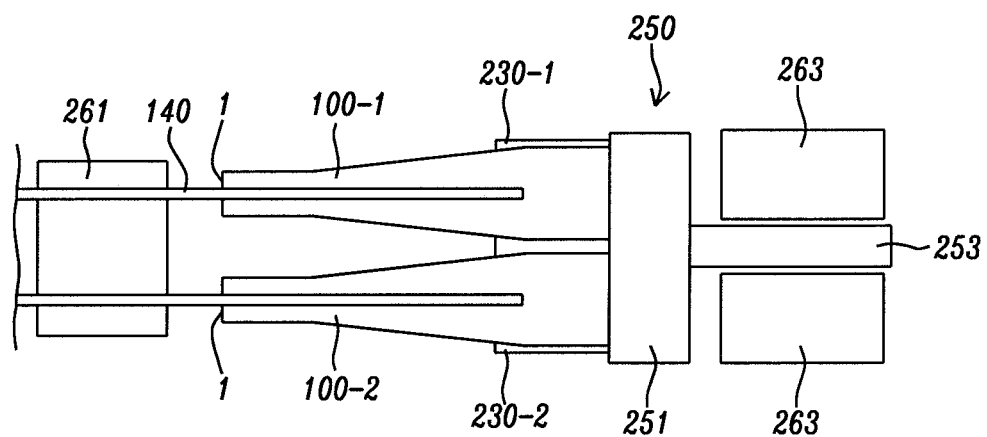
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
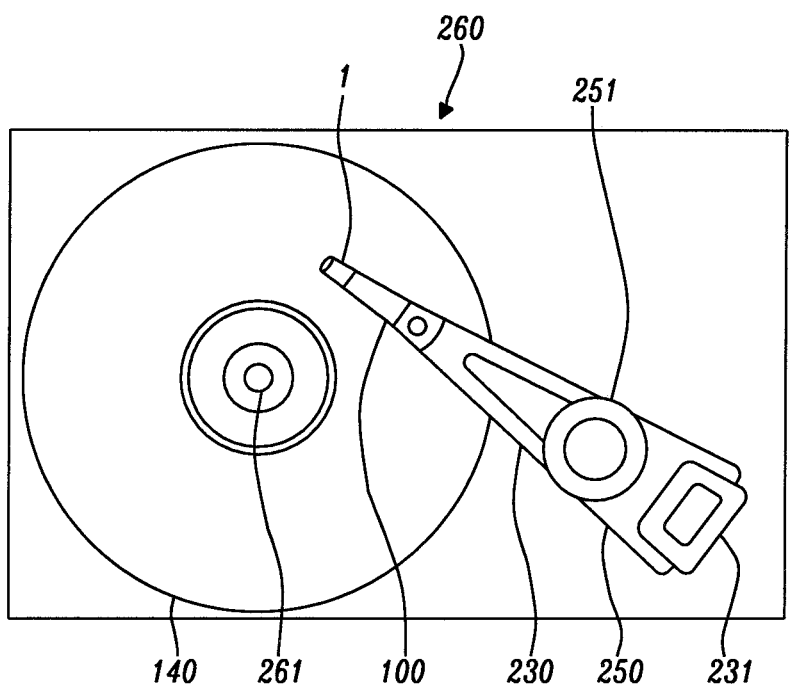
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
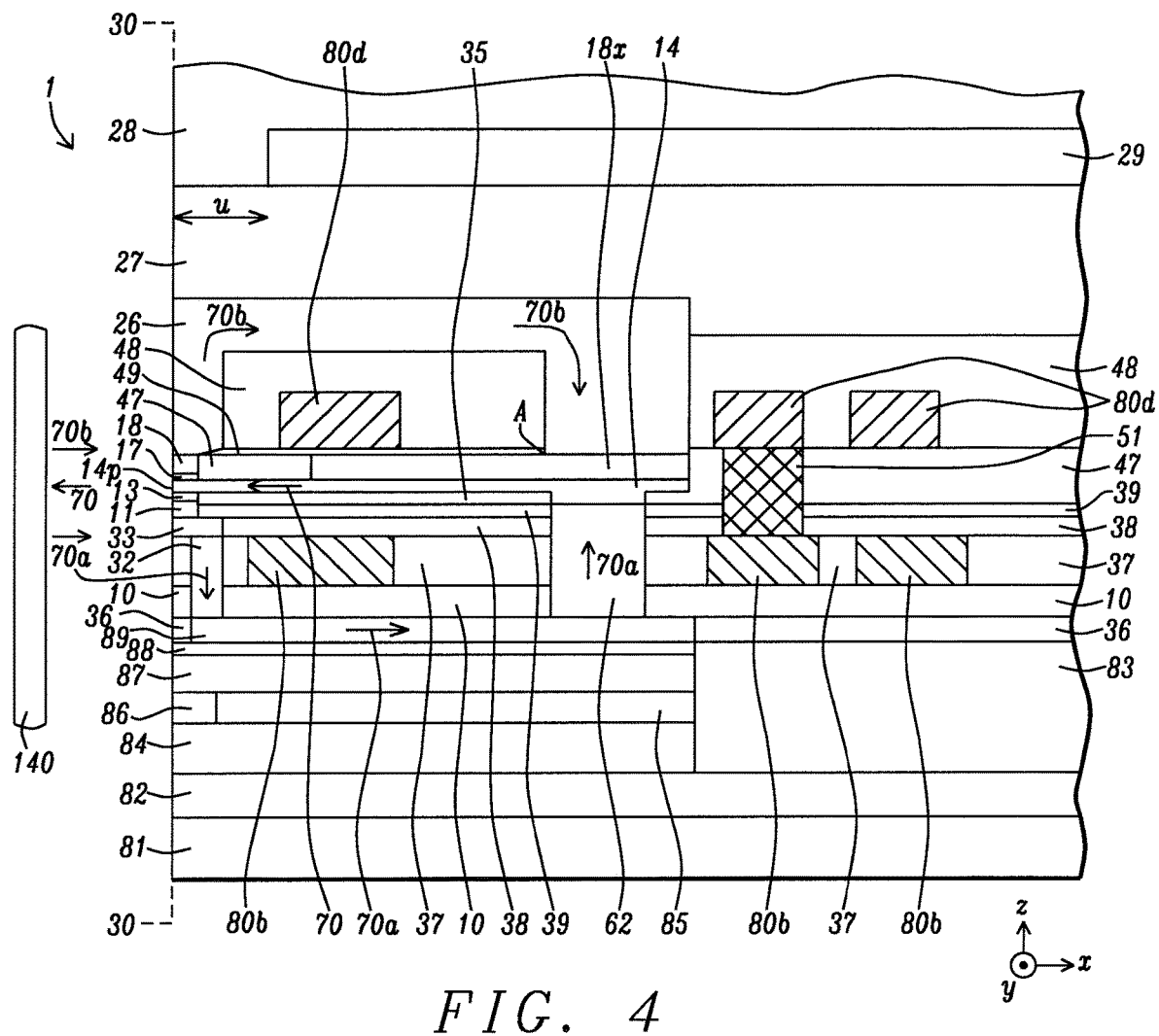
FIG. 4 is a down-track cross-sectional view of a combined read-write head with complete leading and trailing loop pathways for magnetic flux return to the main pole according to an embodiment of the present disclosure.

Referring to FIG. 4, magnetic recording head 1 comprises a combined read-write head. The down-track cross-sectional view is taken along a center plane (44-44 in FIG. 5) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in main pole (MP) layer 14 is generated with flowing a current through bucking coil 80b and driving coil 80d that are below and above the MP layer, respectively, and are connected by interconnect 51. Magnetic flux 70 exits the MP layer at pole tip 14p at the ABS 30-30 and is used to write a plurality of bits on magnetic medium 140. Magnetic flux 70b returns to the MP through a trailing loop comprised of trailing shields 17, 18, PP3 shield 26, and top yoke 18x. There is also a leading return loop for magnetic flux 70a that includes leading shield 11, leading shield connector (LSC) 33, S2 connector (S2C) 32, return path 89, and back gap connection (BGC) 62. The magnetic core may also comprise a bottom yoke 35 below the MP layer. Dielectric layers 10, 11, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 5:
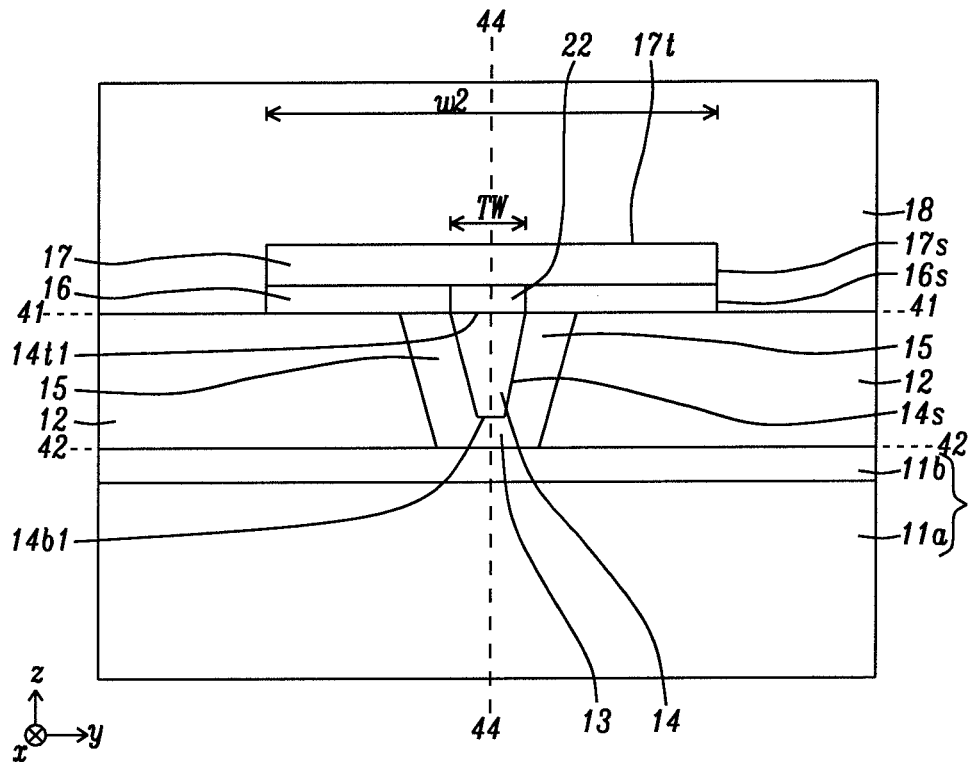
FIG. 5 is an ABS view of a MAMR writer known to the inventors wherein a STO device is formed within a write gap and between a main pole and trailing shield.

Referring to FIG. 5, an ABS view of an existing MAMR writer known to the inventors is shown where there is all wrap around (AWA) shield structure surrounding the MP 14. MP trailing side 14t1 is bisected by center plane 44-44 that also passes through MP leading side 14b1. There are side gaps 15 made of a dielectric material adjoining each MP side 14s, a leading gap 13 between the MP leading side and leading shield (LS) 11, and write gap (WG) 16 formed on plane 41-41 that includes the MP trailing side, and a top surface of side shields 12. A first trailing shield (hot seed layer) 17 is formed on the WG and has a width w2 equal to that of the WG where w2>track width (TW) also known as the pole width (PW). A second trailing shield (write shield) 18 is formed on side shields 12 at plane 41-41, on hot seed top surface 17t, and adjoins sides 17s and 16s of the hot seed layer and WG, respectively. LS 11 may have a top layer 11b called a leading edge taper (LET), and a bottom layer 11a. The LET contacts a bottom surface of each side shield at plane 42-42 that is parallel to plane 41-41, and is orthogonal to the ABS and the center plane. STO device 22 is formed within the WG and between the MP trailing side and hot seed layer.

Figure 6A:
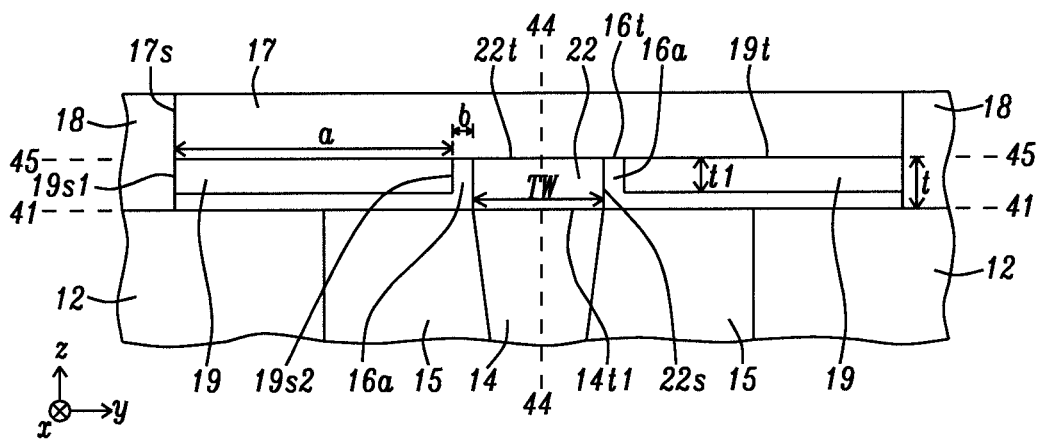
FIG. 6A is an ABS view of a MAMR writer wherein a heat sink is formed within the WG adjacent to each side of a STO device according to an embodiment of the present disclosure.

Referring to FIG. 6A, a first embodiment of the present disclosure is illustrated where the MAMR writer in FIG. 5 is modified with the insertion of a head sink 19 within the WG on each side of center plane 44-44. Preferably, the WG is made of an electrically insulating layer 16a that is a composite of a dielectric material with another material having high thermal conductivity that is not restricted to be an insulator. For example, the insulating layer may be an ALD layer comprised of alumina and diamond. The insulating layer is preferably a conformal layer of thickness/width b from 5 Angstroms to 80 Angstroms that adjoins STO device sides 22s and is formed on top surfaces of each side shield 12 and side gap 15 at plane 41-41. Each heat sink has a first inner side 19s2 that is separated from a STO side by insulating layer width b, and an outer side 19s1 that contacts write shield (WS) 18 at a width a from 0.05 micron to 1 micron from the inner side.

Heat sink 19 is made of a material such as Ru, Cu, Au, Pt, Pd, W, Ir, diamond-like carbon, or atomic layer deposited diamond with a thermal conductivity that is preferably >100 Watts per meter-Kelvin (W/m-k) to enable efficient heat dissipation through hot seed layer 17, WS 18, and side shields 12. STO thickness t is typically from 5 Angstroms to 250 Angstroms at the ABS. Note that heat sink thickness $t1=(t-b)$ in the exemplary embodiment. In an alternative embodiment, $t1>(t-b)$ so that heat sink thickness may be optimized independently of STO thickness and provide flexibility to improve performance. Top surface 19t of each heat sink at the ABS is at plane 45-45 that includes the STO top surface 22t, and insulating layer top surface 16t where plane 45-45 is parallel to plane 41-41. The heat sink top surface adjoins a bottom surface of the hot seed layer that is also referred to as a high moment trailing shield preferably made of FeCo, FeCoNi, FeCoN, or NiFe with a magnetization saturation (Ms) from 19 kiloGauss (kG) to 24 kG.

Figure 6B:
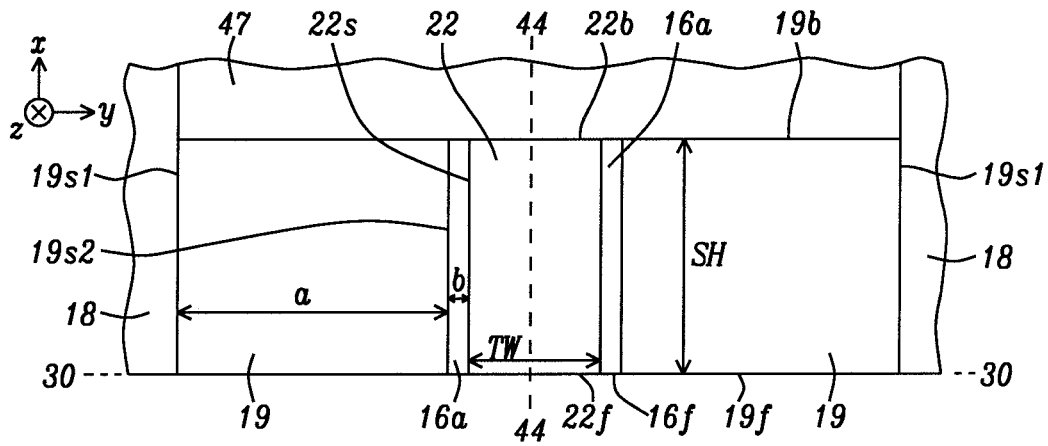
FIGS. 6B-6C are top-down views of the MAMR writer in FIG. 6A according to a first embodiment where the heat sink has a height essentially equal to the stripe height of the STO device, and according to a second embodiment where the heat sink wraps around the STO device, respectively.

Referring to FIG. 6B, a top view of each heat sink 19 adjacent to STO 22 is shown at plane 45-45 with the hot seed layer and overlying MAMR writer layers removed. According to the exemplary embodiment, STO 22 has sides 22s that extend from a front side 22f at the ABS 30-30 to a backside 22b, and have a stripe height (SH) of 10 nm to 100 nm. Insulating layer 16a has a front side 16f at the ABS, and each heat sink 19 has the SH between a front side 19f at the ABS to a backside 19b. Insulation layer 47 may be considered part of the composite WG and adjoins the STO backside and heat sink backsides, and is formed between WS 18 on each side of center plane 44-44. In other embodiments (not shown), the heat sink backside may be at a greater distance than SH from the ABS.

Figure 6C:
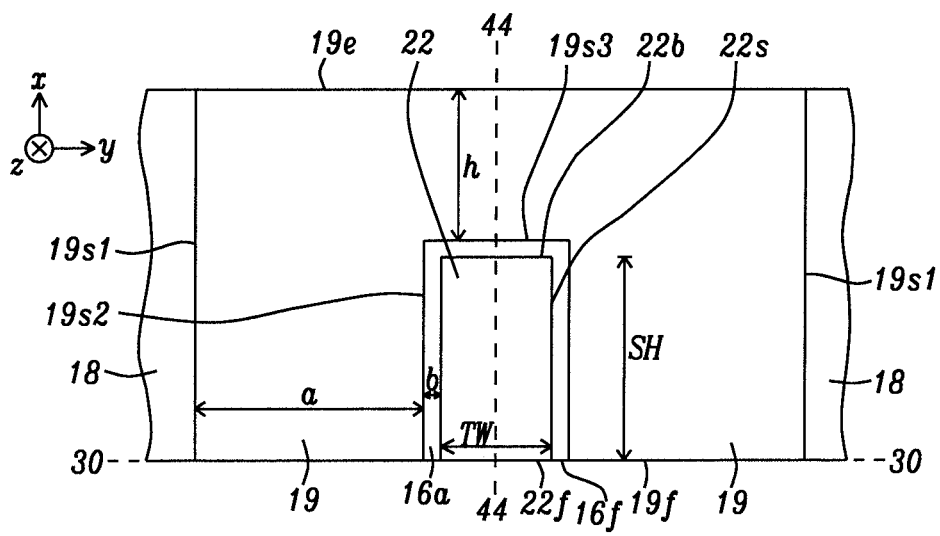

According to another embodiment of the present disclosure depicted in a top-down view in FIG. 6C, heat sink 19 forms a continuous layer around STO 22. In particular, insulating layer 16a may wrap around STO 22 and form a continuous layer of width b that adjoins STO sides 22s and backside 22b. The heat sink now has a backside 19e that extends in a cross-track direction from WS 18 on one side of center plane 44-44 to the WS on the other side of the center plane. Heat sink backside 19e is at height h preferably >100 nm from a heat sink second inner side 19s3 that is adjacent and parallel to the STO backside. This heat sink embodiment has the advantage of better heat dissipation compared with the heat sink in FIG. 6B, but requires additional fabrication steps.

The inventors have previously disclosed multiple configurations for STO devices that may be employed to generate a RF field on the magnetic grains near the transition being written in a magnetic medium during a write process. For example, in related U.S. Pat. No. 9,230,571, a STO device is described wherein a SP layer is formed between a seed layer and a non-magnetic (NM) spacer, and an OL is between the NM spacer and a cap layer.

Figure 7A:
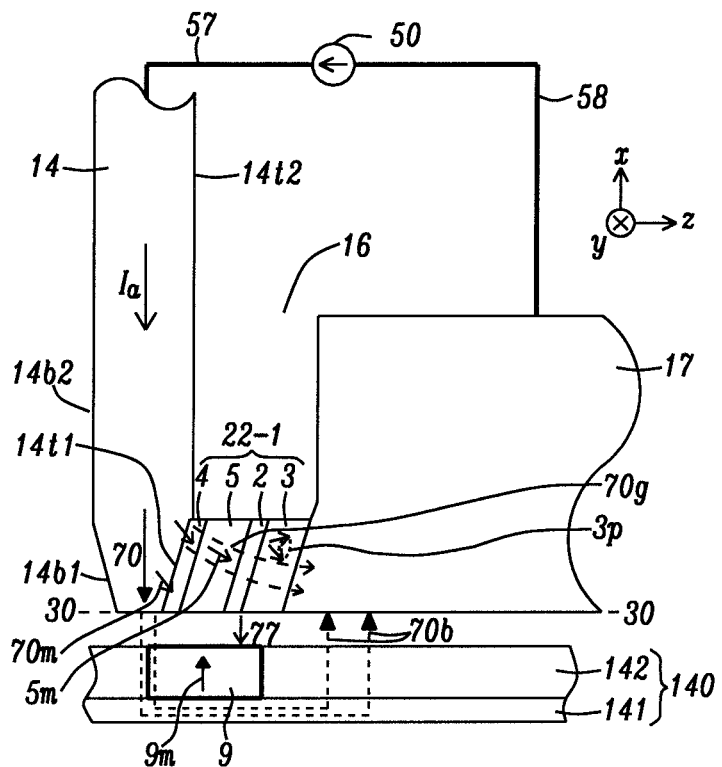
FIG. 7A shows a first configuration for the STO device in FIG. 6A where $I_a$ is applied from the MP to TS to induce a precessional state in an OL, which in turn generates a RF field near the grains where a bit is written according to an embodiment of the present disclosure.

Referring to FIG. 7A, a MAMR writer having a STO device 22-1 is shown and features a STO stack wherein a second non-magnetic (NM2) layer 4, SP layer 5, first non-magnetic (NM1) layer 2, and OL 3 are sequentially formed on MP tapered trailing side 14t1, and where the OL top surface contacts a portion of hot seed layer 17. This STO configuration was previously described in related U.S. Pat. No. 10,424,326. Here, MP 14 has a sufficiently large local magnetic field 70 to write the media bit 9 with magnetization 9m on magnetic medium 140. Magnetic flux 70 in the MP proceeds through the ABS 30-30 and into medium layer 142 and soft underlayer (SUL) 141. A portion of the flux 70b is collected by hot seed layer 17 and then returns to the MP through a trailing loop (such as one shown in FIG. 4). STO 22-1 is at the ABS and is formed on the MP tapered trailing side 14t1, which connects with a MP top surface 14t2 that is aligned orthogonal to the ABS. The MP leading side 14b1 is also tapered and connects with the MP bottom surface 14b2. Write gap field flux 70g is shown across the STO in the general direction from the MP to hot seed layer.

The microwave assisted magnetic recording (MAMR) aspect involves applying current $I_a$ from a direct current (dc) source 50 through lead 57 to the MP 14 and through STO 22-1 to hot seed layer 17 and then returning through lead 58 to the dc source. The applied current is spin polarized by SP layer 5, and produces a spin torque on OL 3 that drives OL magnetization into a precessional state 3p, which in turn produces a RF field 77 on bit magnetization 9m. Bit magnetization oscillates into a precessional state (not shown) thereby reducing a switching field of medium bit 9 so that the bit can be switched using a smaller MP field 70. Note that MP magnetization 70m proximate to MP tapered trailing side 14t1 is substantially parallel to SP magnetization 5m and in the general direction of the WG field flux 70g from the MP 14 to hot seed layer 17.

Figure 7B:
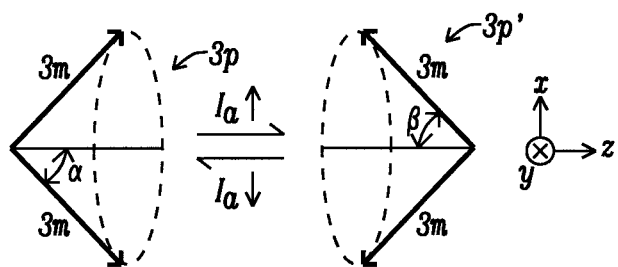
FIG. 7B depicts an OL precessional state that may flip to an opposite direction (opposing the write gap magnetic flux field) when the applied current reaches a sufficient magnitude.

As indicated in FIG. 7B, the oscillation in OL 3 is in a dynamic state called a precessional state 3p where the cone angle α increases with increasing applied current density. In a first range of relatively low current density shown on the left side of the drawing, OL magnetization 3m is in a direction pointing substantially toward the hot seed layer (not shown). However, if the applied current increases to a second range of relatively high current density, magnetization 3m flips to a direction substantially pointing away from the hot seed layer as depicted on the right side of the drawing. Precessional state 3p' has a cone angle β that decreases with increasing current density. At sufficiently high current density, angle β is proximate to 0 degrees (pointing toward the MP tapered trailing side). It should be understood, that in both precessional states 3p and 3p', the MAMR effect increases with increasing angle α and β, respectively. Furthermore, magnetization "flipping" is reversible. Thus, precessional state 3p' will return to precessional state 3p if applied current density is reduced by a sufficient amount.

Figure 8:
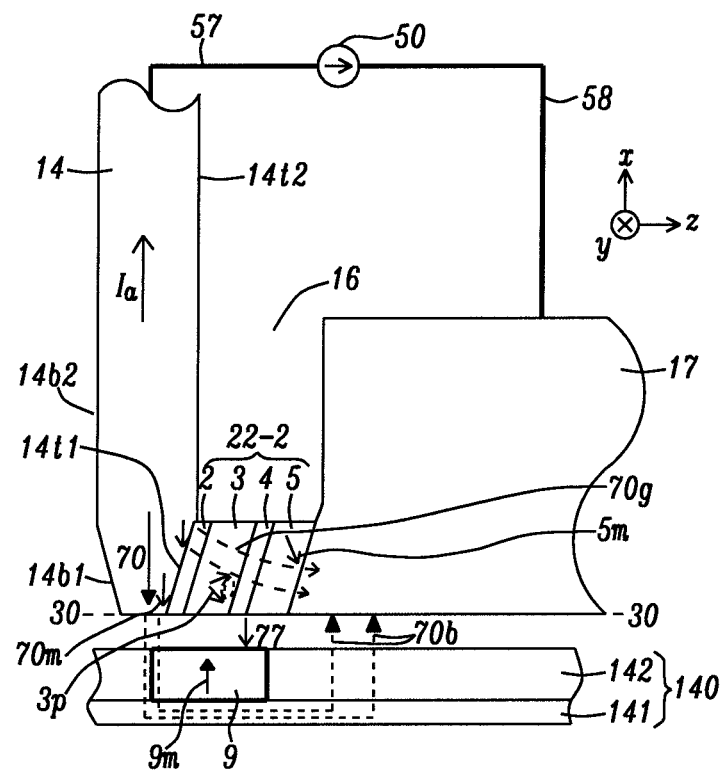
FIGS. 8-10 depict second through fourth configurations for the STO device in FIG. 6A of the present disclosure where $I_a$ is applied from the MP to TS, or in the reverse direction, to induce a precessional state in an OL, which in turn generates a RF field proximate to the bit that is being written on the media.

In an alternative STO configuration 22-2 shown in FIG. 8, the MAMR writer structure and STO layers in FIG. 7A are retained except the positions of SP layer 5 and FGL 3 are switched so that NM1 spacer 2, OL 3, NM2 spacer 4, and SP layer 5 are sequentially formed on the MP tapered trailing side 14t1. Again, MP magnetization 70m, OL magnetization 3m, and SP magnetization 5m are substantially toward hot seed layer 17 while OL magnetization has precessional state 3p when a first range of current density for current $I_a$ is applied. In this case, $I_a$ is applied from the hot seed layer to MP 14 in order for SP layer 5 to generate spin torque on the OL that drives the OL into a precessional state 3p (or 3p') to provide a MAMR effect on bit magnetization 9m during a write process. As a result, a smaller MP field 70 is needed to switch the bit magnetization.

Figure 9:
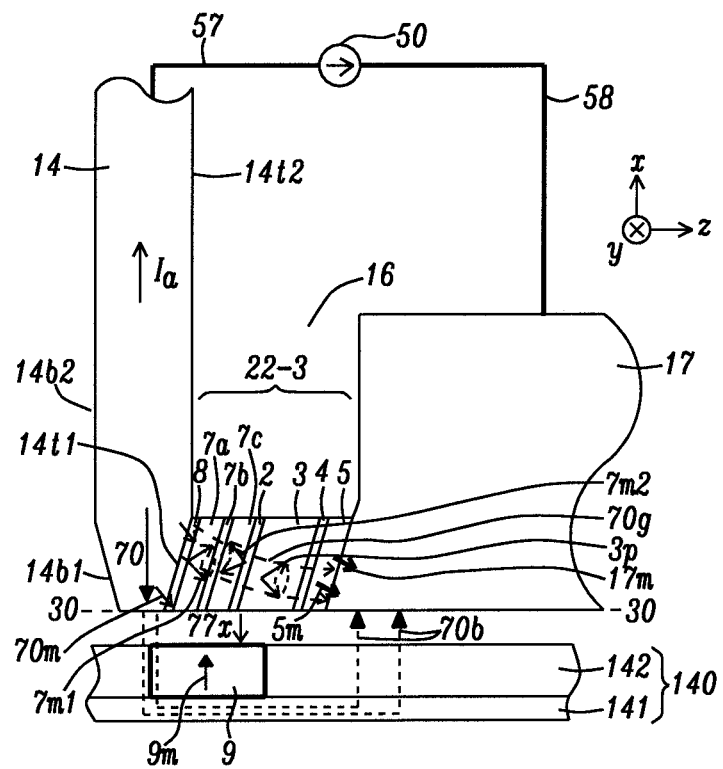

In FIG. 9, an alternative STO configuration is shown that was disclosed in related U.S. Pat. No. 10,424,326 and represents a modification of STO device 22-2. In particular, spin torque on OL magnetization is enhanced with the insertion of a second SP layer on an opposite side of OL 3 with respect to SP layer 5, and where the second SP layer has a magnetization that is substantially anti-parallel to magnetization 5m. In STO device 22-3, seed layer 8, and a SP1/AF coupling/SP2 stack of layers 7a/7b/7c are sequentially formed on MP tapered trailing side 14t1 where SP2 layer 7c adjoins a bottom surface of NM1 spacer 2. Therefore, when $I_a$ is applied from hot seed layer 17 to MP 14, OL magnetization is driven into a precessional state 3p (or 3p') because of additive spin torque from SP2 layer 7c and SP layer 5. SP1 layer 7a with magnetization 7m1 and SP2 layer with magnetization 7m2 are driven into precessional states, and together with the OL 3 precessional state produce a cumulative RF field 77x that is typically greater than RF field 77 in previous embodiments to further reduce the MP field 70 required to switch bit magnetization 9m.

Figure 10:
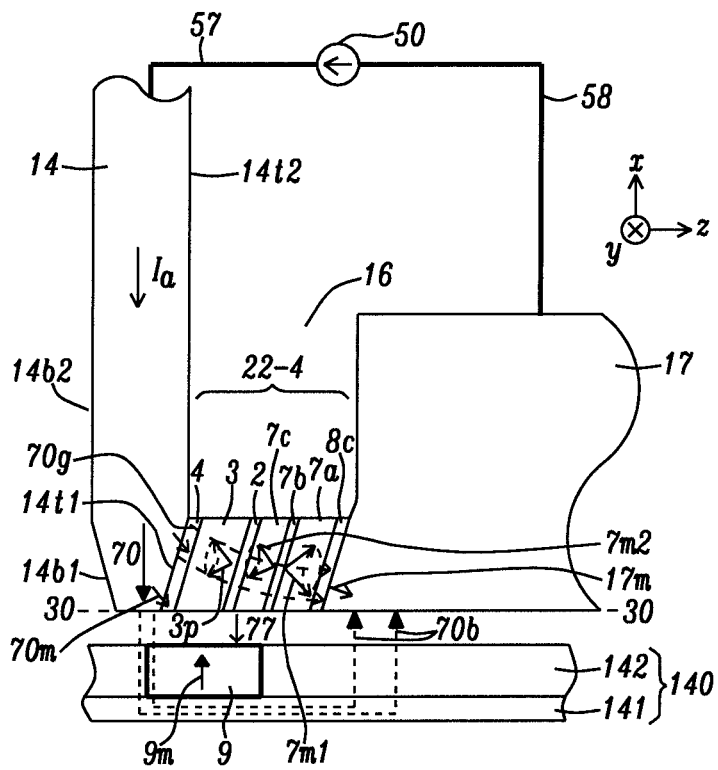

FIG. 10 depicts another STO device 22-4 that may be used in the MAMR writer of the present disclosure. In this embodiment, NM2 spacer 4, OL 3, NM1 spacer 2, SP2 layer 7c, AF coupling layer 7b, SP1 layer 7a, and capping layer 8c are sequentially formed on MP tapered trailing side 14t1. Accordingly, SP layer 5 is effectively merged into the MP proximate to STO 22-4 such that applied current $I_a$ is spin polarized by MP magnetization 70m to exert a spin torque on OL 3 that together with spin torque from the SP2 layer drives the OL into precessional state 3p (or 3p' depending on $I_a$ current density). As in the previous embodiment, precessional state 3p together with precessional magnetizations 7m1, 7m2 in SP1 and SP2 layers, respectively, provides a cumulative RF field 77x on bit magnetization 9m thereby requiring a lower MP field 70 to switch the bit magnetization during a write process.

In related U.S. Pat. No. 10,490,216, additional STO designs are described where both of the MAMR effect and a MP field enhancement (as a result of OL flipping to precessional state 3p' that reduces WG field flux 70g) are simultaneously optimized rather than enlarging one at the expense of the other. As mentioned earlier, the advantage of the heat sink structure of the present disclosure is not limited to a specific STO design but is beneficial to any MAMR writer wherein the elevated temperature of the STO is affecting the reliability of the STO element.

In all embodiments, NM1 and NM2 spacers 2 and 4, respectively, may be single layer or multilayer films as appreciated by those skilled in the art, and are preferably a non-magnetic metal with a long spin diffusion length such as Cu, Ag, or Au so that current polarized by the adjacent SP layer 5 and SP2 layer 7c (when present) do not encounter strong spin-flip scattering in the spacers. In other embodiments, one or both NM spacers may be a metal oxide layer similar to the metal oxide spacer that was disclosed in related U.S. Pat. No. 9,230,571. The spacers also have sufficient thickness to prevent strong ferromagnetic coupling between magnetic layers on each side thereof. Each of SP 5, OL 3, and SP1 layer 7a and SP2 layer 7b (when present) may be a single layer or alloy that is Fe, Co, Ni, CoFe, NiFe, or CoFeNi, for example, or a multilayer of one or more of the aforementioned elements and alloys.

In order to demonstrate the benefit of a MAMR writer having a heat sink formed adjacent to a STO device as disclosed herein, a finite element modeling (FEM) simulation was performed to confirm the quantitative reduction of STO device temperature rise during a typical 140 mV operation. The following STO dimensions were used in the FEM simulation: 40 nm width; 17 nm thickness, and 40 nm stripe height (SH) where SH is essentially equal to a throat height dimension in the MAMR writer. The heat sink in rows 3-6 of Table 1 below has a thickness (t1)=17 nm (FIG. 6A), and a cross-track width "a"=500 nm, and the ALD (alumina+diamond) insulator 16a has width "b"=2 nm as shown in FIG. 6C.

TABLE 1

FEM simulation results for MAMR writer configurations using SH = 40 nm, total resistance of 31.1 ohm = 20.6 ohm from STO device + 10.5 ohm from leads

| Heat sink configuration | Temp. rise (deg. C) @140 mV in STO | Thermal conductivity (W/m-K) |
|---|---|---|
| None - all alumina WG | 129 | |
| None - all AlN in WG | 122 | AlN = 40 |
| Ru at back of STO with 2 nm ALD insulator | 122 | Ru = 117 |
| Ru at back of STO & at ABS (Emb. 2) with 2 nm ALD insulator | 115 | |
| Cu at back of STO & at ABS (Emb. 2) with 2 nm ALD insulator | 103 | Cu = 387 |
| Diamond at back of STO & at ABS (Emb. 2) | 79 | Diamond = 2000 |

The STO was modeled as a single column of electrical conductor and its resistivity was tuned to match with the assumed STO device resistance and lead resistance of 20.6 ohm and 10.5 ohm, respectively. The results in Table 1 show that replacing alumina with AlN only generated a modest decrease in the temperature rise within the STO device. When an ALD insulator having a 2 nm width, and a Ru or Cu heat sink is formed behind and adjacent to the STO as in the second embodiment (Emb. 2), there is an 11% and 20% improvement, respectively, in the temperature rise. Note that when a Ru heat sink layer in combination with an ALD insulator is formed only behind the STO device, there is no improvement over the pure AlN insulator example. Optimum performance (40% temperature rise reduction) is achieved when a heat sink made of diamond with a thermal conductivity=2000 W/m-K is employed that is considerably greater than the values for Ru (117 W/m-K) and Cu (387 W/m-K). The results demonstrate that the heat sink structure provides a significant temperature rise reduction in the adjacent STO device when the MAMR writer of the present disclosure is operated at the same BHV compared with a MAMR writer without the heat sink. Alternatively, for the same EM reliability (same temperature rise as a MAMR writer without the heat sink), the MAMR writer disclosed herein allows higher BHV to enhance performance and enable higher area density capability (ADC).

Figure 11A:
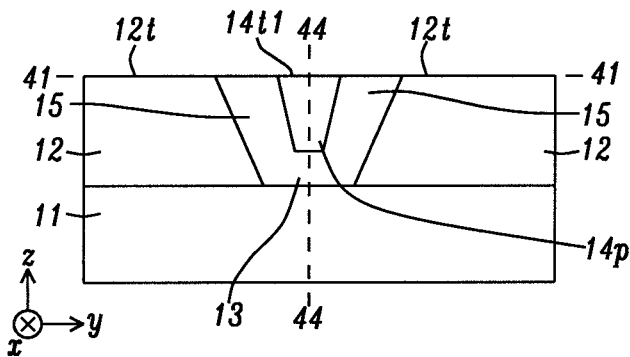
FIG. 11A and FIG. 11B show an ABS view and down-track cross-sectional view, respectively, of a first step in the process of forming a MAMR writer of the present disclosure where a tapered trailing side is formed on the main pole.
Figure 11B:
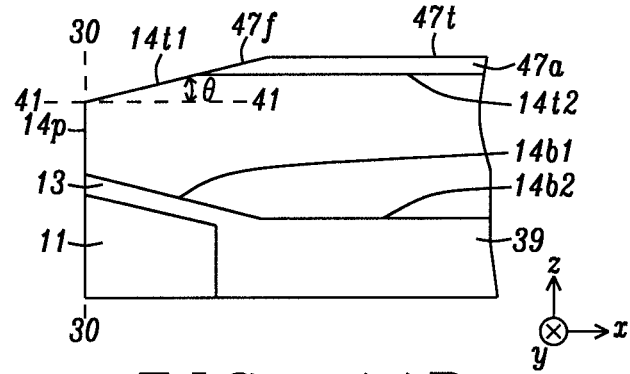

The present disclosure also encompasses a process sequence for fabricating a heat sink adjacent to a STO device according to an embodiment described herein. A partially formed MAMR writer structure including MP tip 14p that adjoins side gaps 15 and leading gap 13 in FIG. 11A is provided according to a conventional process sequence. Side shield top surfaces 12t are coplanar with a trailing edge of the MP tapered trailing side 14t1 at plane 41-41, which is orthogonal to the subsequently formed ABS plane. FIG. 11B shows the down-track cross-sectional view at plane 44-44 in FIG. 11A. MP tapered trailing side 14t1 has a taper angle θ and is coplanar with a tapered front side 47f of dielectric layer 47a made of $Al_2O_3$ or $SiO_2$ that is formed on MP top surface 14t2. Note that the eventual ABS, hereafter referred to as ABS plane 30-30, is not determined until a lapping process is performed after all layers in the MAMR writer structure are formed.

Figure 12:
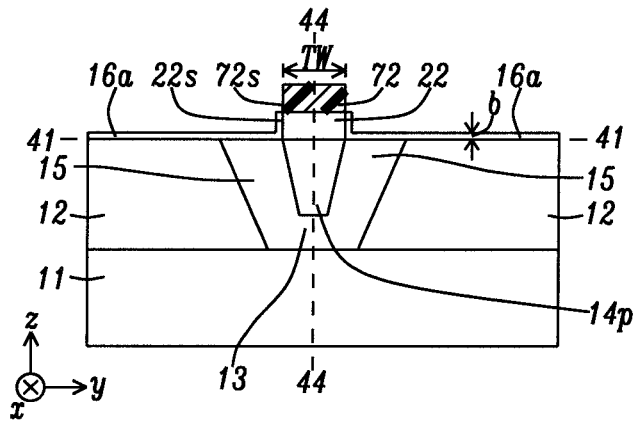
FIG. 12 shows an ABS view of the MAMR writer structure in FIG. 11A after a STO stack of layers is deposited and is patterned to establish a cross-track width for the STO device, and then a first portion of the WG layer is deposited that adjoins the STO sides.

In FIG. 12, a STO stack of layers 22 that may have one of the configurations described previously is deposited on the MP tapered trailing side 14t1 and on dielectric layer 47. The stack of layers is preferably conformal to the underlying topography and has a uniform thickness. Next, a first photoresist layer is coated on the STO stack of layers, and is patternwise exposed and developed to provide a photoresist mask 72 having sides 72s and a cross-track width TW that is bisected by plane 44-44. The photoresist mask pattern is etch transferred through the STO stack of layers using one or both of an ion beam etch (IBE) and reactive ion etch (RIE) process, for example, thereby forming STO device 22 with sides 22s separated by track width TW. In some embodiments, the IBE/RIE process may simultaneously generate a backside on the STO device. Thereafter, insulator 16a having thickness b is conformally deposited on each side shield 12, and on side gaps 15, and with a width b on STO device sides 22s using an atomic layer deposition (ALD) method, for example.

Figure 13:
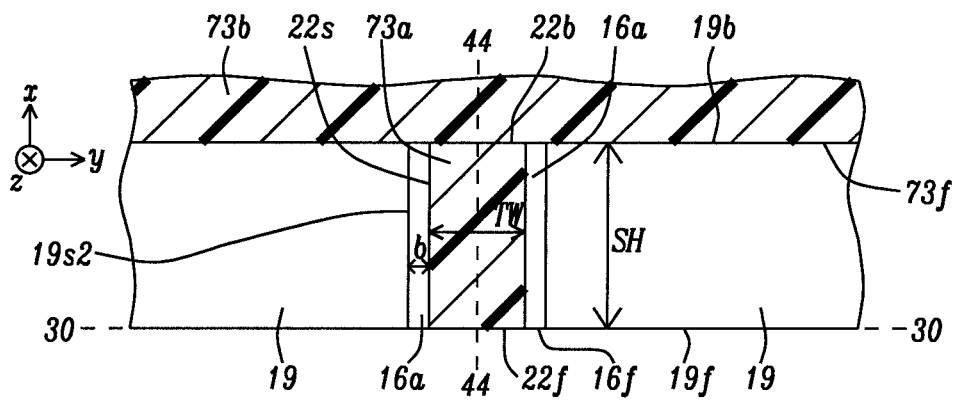
FIG. 13 depicts a top-view of the MAMR writer structure in FIG. 12 after a heat sink is deposited on the WG layer on opposite sides of the STO device according to an embodiment of the present disclosure.

Referring to FIG. 13, a top-down view is depicted of the partially formed MAMR writer after the first photoresist is removed by a conventional method, and a second photoresist layer is patternwise exposed and developed to form a front portion 73a of the second photoresist layer above the STO device between the ABS plane 30-30 and up to a stripe height (SH). There is also a back portion 73b of the second photoresist layer extending from a front side 73f at the SH toward a backside (not shown) of the MAMR writer. Heat sink 19 is deposited on insulator 16a on each side of the center plane 44-44 in regions not covered by the second photoresist layer 73a/73b. At this point, heat sink 19 extends from the ABS plane to a backside 19b at the SH, and has an inner side 19s2 adjoining insulator 16a at a width b from each STO side 22s.

Figure 14:
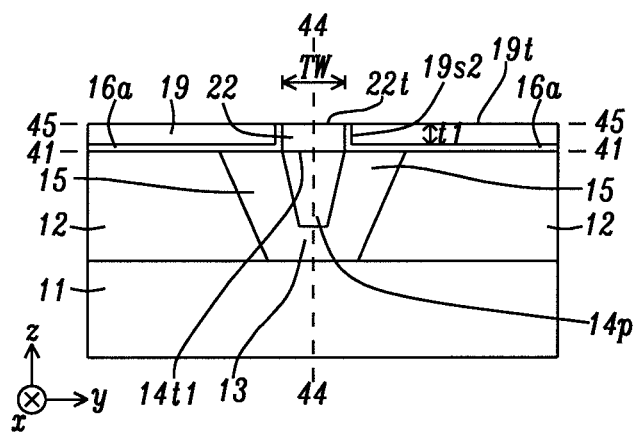
FIG. 14 is an ABS view of the MAMR writer structure in FIG. 13 after a photoresist stripping process is performed to remove the photoresist.

Referring to FIG. 14, an ABS view of the MAMR writer in FIG. 13 is shown after the second photoresist layer is removed by conventional means. A heat sink top surface 19t that is coplanar with STO top surface 22t at plane 45-45 is formed. Each heat sink 19 has a thickness t1.

Figure 15:
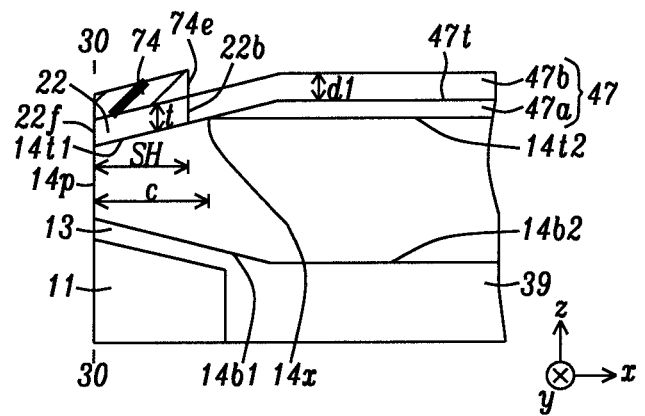
FIG. 15 is a down-track cross-sectional view of the MAMR writer structure in FIG. 14 after a second photoresist mask is formed on the STO device, and an insulation layer is deposited behind the STO device.

In FIG. 15, a down-track cross-sectional view at plane 44-44 is depicted for the partially formed MAMR writer structure after a third photoresist is patternwise exposed and patterned to form photoresist mask 74 that extends from the ABS plane 30-30 to a backside 74e at the SH from the ABS plane. Preferably, photoresist backside 74e is aligned above STO backside 22b. Thereafter, insulation layer 47b having thickness dl is deposited on top surface 47t of insulation layer 47a and on portions of MP tapered trailing side 14t1 that are not covered by the photoresist mask. Note that the SH may be less than height c at edge 14x where the MP tapered trailing side 14t1 joins MP top surface 14t2. Also, insulation layers 47a, 47b may be comprised of the same material and designated as insulation layer 47.

Figure 16:
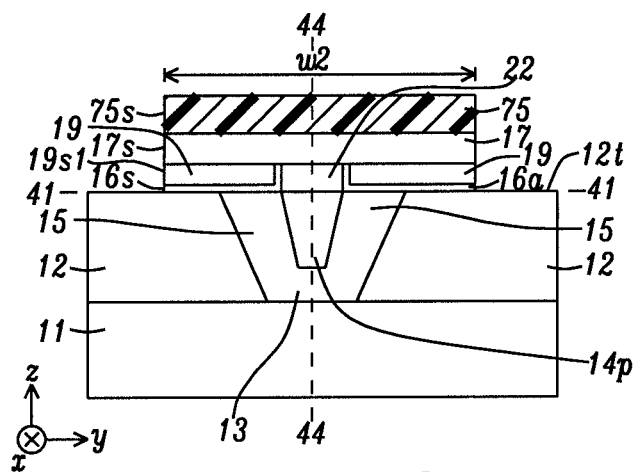
FIG. 16 is an ABS view of the MAMR writer in FIG. 15 after a first TS (hot seed) layer is deposited and patterned on the STO/WG/heat sink structure, and an etch transfers the pattern downward to form far sides on the heat sink and hot seed.

Referring to FIG. 16, after photoresist mask 74 is removed by a conventional method, hot seed layer 17 is deposited on STO top surface 22t and on heat sink top surface 19t. Next, a fourth photoresist layer is coated on the hot seed layer and is patterned to form photoresist mask 75 having sides 75s and a width w2 where w2>TW. Another IBE or RIE step is employed to transfer the photoresist mask pattern through exposed portions of the hot seed layer, heat sink 19, and insulator 16a, and stops on side shield top surface 12t at plane 41-41 thereby generating hot seed layer side 17s, heat sink far (outer) side 19s1, and insulator side 16s on each side of center plane 44-44.

Figure 17:
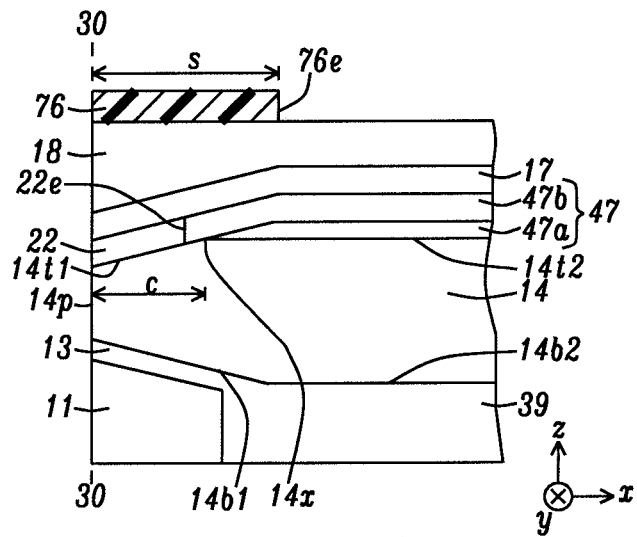
FIGS. 17-18 are down-track cross-sectional views of the MAMR writer in FIG. 16 after a second TS (write shield) is deposited, and then a patterning and etching process is performed to establish a backside on each of the hot seed and overlying write shield (WS) according to an embodiment described herein.

Referring to FIG. 17, photoresist mask 75 is removed. Then, WS 18 is deposited on hot seed layer 17 and on side shields 12. A fifth photoresist layer is coated and patterned on the WS to provide photoresist mask 76 having a backside 76e at height s from the ABS plane 30-30 where s is generally larger than height c of MP edge 14x described earlier.

Figure 18:
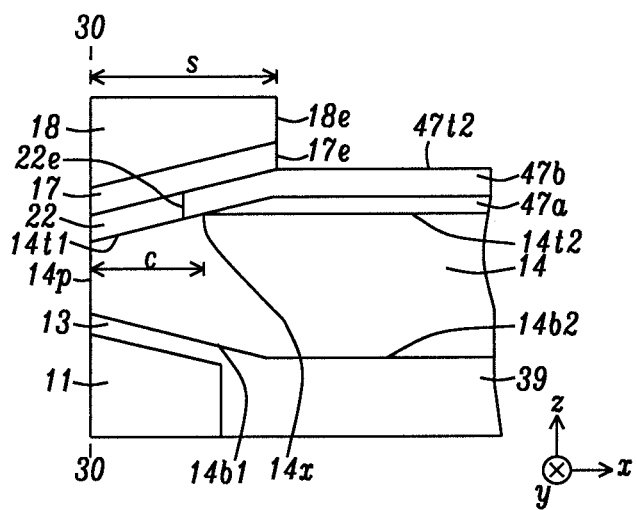

FIG. 18 depicts the partially formed MAMR writer structure in FIG. 17 after a third RIE or IBE step is performed to transfer the photoresist mask pattern through exposed regions of hot seed layer 17 and WS 18, and stops at top surface 47t2 of insulation layer 47 thereby forming hot seed backside 17e and WS backside 18e at height s from the ABS plane 30-30. Thereafter, a conventional process flow is followed to complete the MAMR writer structure. According to one embodiment, a combined read-write head 1 shown in FIG. 4 is formed after a lapping process is completed.

While the present disclosure has been particularly shown and described with reference to, the preferred embodiments thereof, it will be understood by those skilled in the art that various changes in form and details may be made without departing from the spirit and scope of this disclosure.

We claim:

1. A microwave-assisted magnetic recording (MAMR) structure, comprising:

(a) a main pole (MP) that is configured to generate a magnetic (write) field which is directed through a pole tip at an air bearing surface (ABS) to switch a magnetization direction in grains of one or more magnetic bits in a magnetic medium, and to generate a write gap (WG) field flux in a down-track direction across a WG wherein a spin torque oscillator (STO) device is formed and contacts a hot seed (HS) layer that is part of a trailing shield structure;

(b) the HS layer with a side at the ABS, and a bottom surface facing the MP;

(c) the STO device having an uppermost surface contacting the HS layer bottom surface, a bottommost surface adjoining a MP trailing side, and a side on each side of a center plane that bisects the MP trailing side, and a backside at a stripe height (SH) from the ABS, and configured so that an oscillation layer (OL) is driven into a precessional state by spin torque from at least one spin polarization (SP) layer within the STO device thereby generating a radio frequency (RF) field on the grains where a transition is being written, the RF field reduces the MP write field necessary to switch the magnetization direction of the grains;

(d) an insulator layer with a first thickness (b) on the MP trailing side and a first width (b) on the STO sides; and (e) a heat sink layer formed on the insulator layer on each side of the center plane and having a first inner side contacting the insulator layer and adjacent to a STO side, and an outer side at a first width from the first inner side and that contacts a write shield (WS), and wherein the heat sink layer has a front side at the ABS, and a backside at least the SH from the ABS.

2. The MAMR structure of claim 1 further comprising a back portion of the heat sink layer behind the STO back side, and separated from the STO backside by an insulation layer, the backside of the heat sink layer is at a height (h) from a second inner side of the heat sink layer that is parallel to the STO backside.

3. The MAMR structure of claim 2 wherein the heat sink layer wraps around the STO device and is a continuous layer extending from the ABS on one side of the center plane to the ABS on a second side of the center plane.

4. The MAMR structure of claim 1 wherein the heat sink layer is comprised of Ru, Cu, Au, Pt, Pd, W, Ir, or diamond-like carbon.

5. The MAMR structure of claim 1 wherein the SH is from about 10 nm to 100 nm.

6. The MAMR structure of claim 1 wherein the first thickness and the first width of the insulator layer is from about 0.5 nm to 8 nm.

7. The MAMR structure of claim 1 wherein the first width of the heat sink layer is from about 0.05 micron to 1 micron.

8. The MAMR structure of claim 1 wherein the STO device has a second thickness (t), and the heat sink layer has a thickness t1 where t1≥(t−b).

9. The MAMR structure of claim 1 wherein the at least one SP layer is separated from the OL by a non-magnetic spacer, and the at least one SP layer and OL are a single layer or alloy that is Fe, Co, Ni, CoFe, NiFe, or CoFeNi, or a multilayer of one or more of the aforementioned elements and alloys.

10. A head gimbal assembly (HGA), comprising:
    (a) the MAMR structure of claim 1; and
    (b) a suspension that elastically supports the MAMR structure, wherein the suspension has a flexure to which the MAMR structure is joined, a load beam with one end connected to the flexure, and a base plate connected to the other end of the load beam.

11. A magnetic recording apparatus, comprising:
    (a) the HGA of claim 10;
    (b) a magnetic recording medium positioned opposite to a slider on which the MAMR structure is formed;
    (c) a spindle motor that rotates and drives the magnetic recording medium; and
    (d) a device that supports the slider, and that positions the slider relative to the magnetic recording medium.

12. A method of forming a microwave-assisted magnetic recording (MAMR) structure, comprising:
    (a) providing a main pole (MP) with a tapered trailing side that extends from an air bearing surface (ABS) plane to a first height (c) where the MP tapered trailing side connects with a MP top surface aligned orthogonal to the ABS plane and having a first dielectric layer formed thereon, and wherein the MP is separated from a side shield on each side of a center plane by a side gap, wherein the center plane bisects the MP tapered trailing side;
    (b) depositing a spin torque oscillator (STO) stack of layers on a top surface of the MP tapered trailing side, first dielectric layer, side gaps, and side shields, and forming a side on the STO stack of layers on each side of the center plane, the STO stack comprises an oscillation layer that generates a radio frequency (RF) field when driven into a precessional state;
    (c) sequentially depositing a electrically insulating layer with a first thickness, and a heat sink layer with a second thickness on the side shields and side gaps, and on the STO sides, and forming a top surface on the heat sink layer;
    (d) depositing a hot seed layer on the top surfaces of the heat sink layers and STO stack of layers, and forming a side on the hot seed layer, heat sink layer, and WG on each side of the center plane such that the side shield top surfaces are exposed; and
    (e) depositing a write shield (WS) on a top surface and the sides of the hot seed layer, on the exposed side shield top surfaces, and contacting the sides of the heat sink layer.

13. The method of claim 12 wherein the STO stack of layers has a backside at a stripe height (SH) from the ABS plane, and the heat sink layer has a front side at the ABS plane and a backside at least the SH from the ABS.

14. The method of claim 13 wherein the SH is from 10 nm to 100 nm.

15. The method of claim 12 wherein the heat sink layer has an inner side contacting a portion of the electrically insulating layer that adjoins a STO side, and an outer portion at a first width from the inner side and that contacts the WS.

16. The method of claim 15 wherein the first width is from 0.05 micron to 1 micron.

17. The method of claim 12 wherein the first thickness is from 0.5 nm to 8 nm.

18. The method of claim 12 wherein the STO stack of layers further comprises at least one spin polarization (SP) layer, and a non-magnetic spacer between the at least one SP layer and OL, and wherein the at least one SP layer and OL are a single layer or alloy that is Fe, Co, Ni, CoFe, NiFe, or CoFeNi, or a multilayer of one or more of the aforementioned elements and alloys.

19. The method of claim 12 wherein the heat sink layer wraps around the STO stack of layers and is a continuous layer extending from the ABS plane on one side of the center plane to the ABS plane on a second side of the center plane.

20. The method of claim 12 wherein the heat sink layer is comprised of Ru, Cu, Au, Pd, Pt, W, Ir, or diamond-like carbon.

\* \* \* \* \*